US 11,807,772 B2

(12) United States Patent
Bernad et al.

(10) Patent No.: US 11,807,772 B2
(45) Date of Patent: Nov. 7, 2023

(54) USE OF COATING COMPOSITIONS FOR WIND TURBINE BLADES

(71) Applicant: Hempel A/S, Kongens Lyngby (DK)

(72) Inventors: Pablo Luis Bernad, Kongens Lyngby (DK); Erik Kallesøe, Kongens Lyngby (DK); Kushagra Mehrotra, Kongens Lyngby (DK)

(73) Assignee: HEMPEL A/S, Kongens Lyngby (DK)

( * ) Notice: Subject to any disclaimer, the term of this patent is extended or adjusted under 35 U.S.C. 154(b) by 157 days.

(21) Appl. No.: 17/617,951

(22) PCT Filed: Jun. 26, 2020

(86) PCT No.: PCT/EP2020/068019
§ 371 (c)(1),
(2) Date: Dec. 10, 2021

(87) PCT Pub. No.: WO2020/260578
PCT Pub. Date: Dec. 30, 2020

(65) Prior Publication Data
US 2022/0259456 A1 Aug. 18, 2022

(30) Foreign Application Priority Data
Jun. 28, 2019 (EP) .................................... 19183414
Jan. 10, 2020 (EP) .................................... 20151250

(51) Int. Cl.
C09D 175/12 (2006.01)
C08G 18/10 (2006.01)
C08G 18/50 (2006.01)
C08G 18/73 (2006.01)
C08G 18/79 (2006.01)
C09D 5/00 (2006.01)

(52) U.S. Cl.
CPC ........... *C09D 175/12* (2013.01); *C08G 18/10* (2013.01); *C08G 18/5024* (2013.01); *C08G 18/73* (2013.01); *C08G 18/792* (2013.01); *C09D 5/002* (2013.01); *F05B 2240/303* (2020.08); *F05B 2280/6011* (2013.01)

(58) Field of Classification Search
CPC .... C08G 18/10; C08G 18/5024; C08G 18/73; C08G 18/792; C09D 5/002; C09D 175/12; F05B 2240/303; F05B 2280/6011
USPC .................................................. 416/241 R
See application file for complete search history.

(56) References Cited

U.S. PATENT DOCUMENTS

| 2012/0093657 A1 | 4/2012 | Kallesoe et al. |
| 2016/0024339 A1 | 1/2016 | Squiller et al. |
| 2018/0362801 A1 | 12/2018 | Wade et al. |
| 2021/0277277 A1* | 9/2021 | Greszta-Franz ..... C09D 175/02 |

FOREIGN PATENT DOCUMENTS

| CN | 109836980 A | 6/2019 | |
| EP | 3495403 A1 | 6/2019 | |
| GB | 2560972 A * | 10/2018 | ............. C08G 18/73 |
| GB | 2560972 A | 10/2018 | |
| WO | 2014151307 A1 | 9/2014 | |
| WO | 2015049260 A1 | 4/2015 | |
| WO | 2015120941 A1 | 8/2015 | |
| WO | 2015136018 A1 | 9/2015 | |
| WO | 2016049104 A1 | 3/2016 | |
| WO | 2016210237 A1 | 12/2016 | |
| WO | 2020094689 A1 | 5/2020 | |

OTHER PUBLICATIONS

Bin Chen et al. "Facile preparation of epoxy based elastomers with tunable T g s and mechanical properties"; RSC Advances, vol. 8, No. 24, Jan. 1, 2018, pp. 13474-13481.
Herring et al. "The increasing importance of leading erosion and a review of existing protection solutions"; Renewable and Sustainable Energy Reviews; 115 (2019) 109382.

* cited by examiner

Primary Examiner — Jorge L Leon, Jr.
(74) Attorney, Agent, or Firm — Ballard Spahr LLP

(57) ABSTRACT

The present invention relates to coating compositions for wind turbine blades. The compositions are particularly useful as topcoats for wind blades and for Leading Edge Protection (LEP). The invention also relates to a wind blade coated with a coating composition of the invention and to a method for application of the coating composition and to a method for repairing and/or replacing the existing coating layer on a wind blade by application of a coating composition of the invention. The invention also relates to a kit of parts comprising the base composition and the curing agent used in the coating composition. The coating composition used for coating a wind blade comprises a base composition comprising a polyetheraspartic ester having the formula (I) below, wherein each R represents a linear or branched $C_1$-$C_{10}$ alkyl residue, such as a linear or branched $C_1$-$C_6$ alkyl residue, such as for example a methyl, ethyl, propyl or butyl residue; and wherein X is a polyether. The coating composition further comprises a curing agent.

20 Claims, No Drawings ns for Leading Edge

USE OF COATING COMPOSITIONS FOR WIND TURBINE BLADES

FIELD OF THE INVENTION

The present invention relates to coating compositions for wind turbine blades. The compositions are particularly useful either as topcoat compositions or as compositions for Leading Edge Protection (LEP). The invention also relates to a wind blade, such as the leading edge of a wind blade coated with coating compositions of the invention and to a method for application of the coating composition and to a method for repairing and/or replacing the existing coating layer on a wind blade by application of a coating composition of the invention. The invention also relates to a kit of parts comprising the base composition and the curing agent used in the coating compositions.

BACKGROUND OF THE INVENTION

In recent years, wind energy has become an important source of electricity production, and contributes significantly to reducing $CO_2$ emissions. Wind power is the use of air flow through wind turbines to provide the mechanical power to turn electric generators.

Wind turbines typically have an upwind rotor with three blades, attached to a nacelle on top of a tall tubular tower. Wind turbine blades, or "wind blades" are usually designed to last around 20 to 25 years. The blades are constantly exposed to the elements and are ideally designed to endure temperature extremes, wind shears, precipitation, and/or other environmental hazards with minimal failure. Coating failure due to erosion is often observed on the leading edge of the blade. Rain, hail, ice, UV, water absorption and other weather conditions erode the leading edge of the blade. This affects the aerodynamic of the blade and could cause severe damages.

Common concepts for protecting the leading edge of wind turbine blades are for example application of an anti-erosive tape or application of a suitable coating composition (see e.g. Herring, Dyer, Martin and Ward. Renewable and Sustainable Energy reviews 115 (2019) 109382). For both concepts good adhesion to the blade and good resilience properties are of outmost importance. For coating compositions the material properties also plays a significant role in order to obtain the right balance between e.g. robustness, hardness and elasticity of the coating. Furthermore, it is desirable that the coating compositions can be easily applied to the wind blade.

Various types of coating compositions are used in protective coatings of wind blades for minimizing erosion including compositions formed from aliphatic polyaspartic esters and isocyanate curing agents. For example WO 2015/136018 suggests the use of aliphatic polyaspartic esters in formulations for wind blade coating and WO 2015/049260 discloses coating compositions comprising an aliphatic polyaspartic ester and a polyisocyanate curing agent and further comprising solid particles of an amino resin based polymer. WO 2015/120941 discloses coating compositions comprising aliphatic polyaspartic esters and at least one polycarbonate diol in the paint base.

SUMMARY OF THE INVENTION

The present invention provides new coating compositions for wind turbine blades. Within the scope of the invention are coating compositions that are useful for Leading Edge Protection (LEP) and compositions that are useful as topcoat compositions for wind turbine blades.

Accordingly, in one embodiment the present invention relates to the use of a coating composition comprising
a) a base composition comprising a polyetheraspartic ester having the formula (I) below

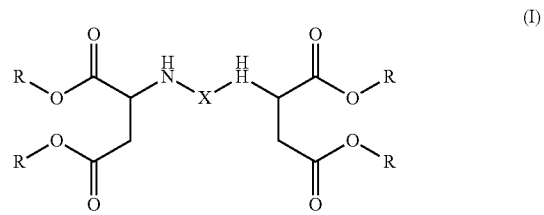

wherein each R represents a linear or branched $C_1$-$C_{10}$ alkyl residue, such as a linear or branched $C_1$-$C_6$ alkyl residue, such as for example a methyl, ethyl, propyl or butyl residue; and wherein X is a polyether;
and
b) a curing agent;
for coating a wind turbine blade.

In one embodiment, the invention relates to a wind turbine blade having on at least a part of the outer surface thereof, a coating made from a coating composition as described above.

Definitions

In the context of the invention, the "leading edge" of a wind blade indicates the portion of the blade that first cuts into the wind. The opposite edge can be denoted "the trailing edge".

The term "Leading Edge Protection" is typically abbreviated "LEP". In the present context the terms "Leading Edge Protective coating (composition)" or "LEP composition" are used interchangeably and indicate a coating composition applied to at least a part of a wind blade including at least to the leading edge or at least to a part of the leading edge of a wind blade to provide protection against erosion caused by for example rain, hail, ice, UV, water absorption and other weather conditions. One way to assess the effectiveness of a Leading Edge Protective Coating is the Rain Erosion Test (RET) described in the experimental section herein. Preferably said LEP is applied on top of a topcoat, but can also be applied under the topcoat, then preferably on top of a primer layer.

In the present context, the term "topcoat" refers to a coating layer applied to at least a part of a wind blade, preferably to the entire wind blade. Preferably, said topcoat coating composition (or "topcoat composition" is applied on top of a primer layer. Various primer compositions for wind blades are known in the art.

In the present context, the term "outermost layer" refers to the final coating system applied to the wind turbine blade, i.e. the outermost layer when the wind turbine blade is in operation. The "outermost layer" of the leading edge is typically a coating made from a LEP coating composition while the outermost layer of other parts of the wind blade typically refers to a coating made from a topcoat composition.

In terms of the complete coating composition, it typically consists of a "base composition" (In which the base component is included) and a "curing agent" (in which the curing agent component is included). Typically the coating composition further include a number of other constituents, e.g. filers and pigments, additives and solvents. It should be understood that when reference is made to the "coating composition", it is the mixed composition, comprising both the base composition and the curing agent, ready to be applied to the wind blade.

In the present context a "blend of polyetheraspartic esters" or "a polyetheraspartic ester blend" indicates a blend of at least two different polyetheraspartic esters.

In the present context, a "kit of parts" concerns a kit of parts comprising two or more containers, wherein one container comprises the base composition and another container comprises the curing agent. The other constituents that might be present in the coating composition of the invention as defined herein e.g. filers, pigments, solvents and additives, may be contained in either of the two containers of the kit of parts, typically in the container comprising said base composition. Alternatively, said other constituents may be contained in one or more further containers.

The term "polyether" indicates a polymer prepared by joining together or polymerizing many molecules of simpler compounds (monomers) by establishing ether links between them. In the context of the present invention, the term "polyether" preferably indicates a polymer in which the repeating unit contains an alkyl residue of one or more carbon atoms linked by an oxygen atom, such as an alkyl residue of between two to six carbon atoms linked by an oxygen atom, such as an alkyl residue of two carbon atoms linked by an oxygen atom. One or more of said carbon atoms may be substituted with a small alkyl such as for example methyl, ethyl or propyl; preferably methyl.

DETAILED DESCRIPTION OF THE INVENTION

The present invention relates to new coating compositions for wind turbine blades, wherein the base composition comprises a polyetheraspartic ester having the formula (I) below

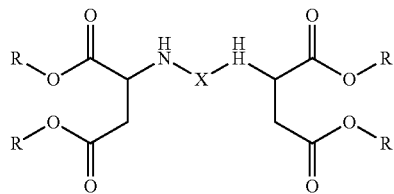

wherein each R represents a linear or branched $C_1$-$C_{10}$ alkyl residue, such as a linear or branched $C_1$-$C_6$ alkyl residue, such as for example a methyl, ethyl, propyl or butyl residue; and wherein X is a polyether. The coating composition also comprises a curing agent.

Polyetheraspartic esters are distinguished from the more conventional aliphatic polyaspartic esters in that X in an aliphatic polyaspartic ester typically is an aliphatic straight or branched alkyl and/or cycloalkyl residue instead of a polyether.

In one embodiment, the invention relates to coating compositions comprising a blend of polyetheraspartic esters wherein X is a polyether having a repeat unit of the structure:

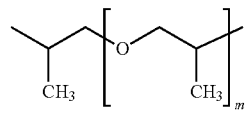

wherein m is in the range of 2 to 35.

The blend of polyetheraspartic esters may comprise at least two different polyetheraspartic esters which have a different number of repeating units in X. In one embodiment, the blend is such that the average value of m is in the range of 2 to 10, such as 2 to 6, such as 2 to 4, such as 2.5 to 3.

Polyetheraspartic esters may be prepared by reacting one or more polyether polyamines with a dialkylmaleate, such as for example a linear or branched $C_1$-$C_{10}$ dialkyl maleate, such a linear or branched $C_1$-$C_6$ dialkyl maleate, such as for example diethyl maleate. Said polyetheraspartic esters may be prepared, for example, by employing the reactants in amounts such that there is at least one equivalent, and in some embodiments approximately one equivalent, of olefinic double bonds for each equivalent of primary amino groups. Examples of methods for the preparation of polyetheraspartic esters can be found in WO 2014/151307 and in Chen et al., RSC Advances (2018), 8: 13474-13481.

Suitable polyether polyamines that may be reacted with dialkylmaleates in Michael addition reactions to produce polyetheraspartic esters for the coating compositions of the invention include the JEFFAMINE polyetheramines commercially available from Huntsman Corporation, The Woodlands, TX; for example polyetheramines from the Jeffamine D series, such as for example Jeffamine D-230. In one embodiment, the blend of polyether polyamines comprises a blend of polyether polyamines according to formula (II) below, wherein p is a number having an average value of at least 2, such as 2 to 35, or 2 to 8, or 2.5 to 6.1

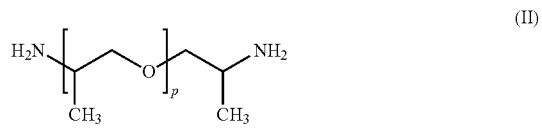

wherein the blend comprises: (1) about 50 to 99% by weight, such as 50 to 90% by weight, or, in some cases, 80 to 90% by weight, of polyether polyamines according to the formula wherein p has an average value of 2.5; and (2) about 1 to 50% by weight, such as 10 to 50% by weight, or, in some cases, 10 to 20% by weight, of polyether polyamines according to the formula wherein p has an average value of 6.1.

An example of a blend of polyetheraspartic esters that is suitable for use in the present invention is Desmophen NH 2850 XP, from Covestro Deutschland AG, Leverkusen, Germany, which has an equivalent weight of about 295, a viscosity at 25° C. of about 170-210 mPa·s, and an amine value between 170-210 mg KOH/g.

The use of polyetheraspartic esters in coating compositions are known from WO 2014/151307 which discloses a coating composition with a resin comprising a polyetheraspartic ester in combination with an aliphatic polyaspartic ester made with Jeffamines. WO 2014/151307 specifically discloses a polyetheraspartic ester made with an aliphatic trifunctional polyether polyamine. WO 2014/151307 does not disclose or suggest the use of polyetheraspartic esters in coating compositions for wind blades neither does WO 2014/151307 suggest using a difunctional polyetheraspartic ester.

Polyetheraspartic ester blends have furthermore been suggested for use in sealant compositions in WO 2016/049104 wherein polyetheraspartic ester blends are used in combination with an aliphatic polyaspartic ester and/or polyether diol. Said sealant compositions are intended for application at for example, expansion joints, control joints, and perimeter joints, of substrates, such as concrete substrates.

Polyetheraspartic ester blends have furthermore been suggested for example for use in peelable automobile coatings (EP3495403) and for use in floor and countertop coatings in combination with an acrylate-containing compound (US 2018/0362801).

In one aspect, the coating composition of the present invention comprising one or more polyetheraspartic esters is a LEP coating composition for wind blades. Said LEP coating provides good protection against erosion which has been demonstrated by the Rain Erosion Test. The LEP composition is capable of providing protection in the particularly harsh rain erosion conditions experienced by wind turbine blades.

In another aspect, the coating composition of the present invention is for a topcoat coating composition for wind turbine blades. Both the topcoat composition and the LEP composition possess good mechanical and physical properties including a high degree of flexibility, which can for example be assessed by the conical mandrel or tensile stress assays. Furthermore, both the topcoat and the LEP coat provides protection against rain erosion.

The compositions of the invention can be applied using standard techniques such as by brush and roller and can even be applied by spray application, such as by conventional air-atomized spray application (topcoat composition) or by airless spray application (both topcoat and LEP compositions). The suitability for spray application is an advantage both in relation to initial coating of a wind blade and in relation to repairing and/or replacing or partly replacing the existing coating layer on a wind blade.

The coating compositions of the invention may also comprise certain amounts of one or more aliphatic polyaspartic esters, which is an optional ingredient when the composition is for use as a LEP coating composition. Aliphatic polyaspartic esters are well known in the art. For a typical aliphatic polyaspartic ester X as illustrated in formula (I) is a straight or branched alkyl and/or cycloalkyl residue. Typical examples of aliphatic polyaspartic esters include substances sold under the trade names Desmophen NH 1220, Desmophen NH 1420, Desmophen NH 1423, Desmophen 1520 and Desmophen NH 1521 commercially available from Covestro Deutschland AG, Leverkusen, Germany.

If the coating composition is for use as a topcoat, the composition comprises one or more aliphatic polyaspartic esters in addition to the polyetheraspartic ester blend. The ratio of polyetheraspartic ester blend to aliphatic polyaspartic esters is typically in the range of 40:60 to 60:40, such as in the range of 45:55 to 55:45, such as about 50:50.

Preferably, if the coating composition is for use in Leading Edge Protection and comprises one or more aliphatic polyaspartic esters, the ratio of polyetheraspartic ester blend to aliphatic polyaspartic esters is in the range of 70:30 to 99:1, such as in the range of 80:20 to 99:1, such as in the range of 85:15 to 99:1, most preferably in range of 90:10 to 99:1 such as 95:5 to 99:1. In a preferred embodiment, the base composition comprises less than 20%, such as less than 15%, such as less than 10%, such as less than 5%, such as less than 1% of any aliphatic polyaspartic esters by weight of said base composition. In one embodiment, said LEP composition is substantially free of any aliphatic polyaspartic esters.

Curing Agent

The coating composition of the invention further comprises a curing agent. In a preferred embodiment, said curing agent comprises one or more polyisocyanates. In the present context, "polyisocyanate" refers to any organic compound that has two or more reactive isocyanate (—NCO) groups in a single molecule such as diisocyanates, triisocyanates, tetraisocyanates, etc., and mixtures thereof. Cyclic and/or linear polyisocyanate molecules may usefully be employed. The number of isocyanate groups per molecule is readily determinable via the isocyanate content and the number-average molecular weight of the respective polyisocyanate. The isocyanate content can be determined for example in accordance with DIN EN ISO 11909 by reaction of the respective sample with excess dibutylamine and back-titration of the excess with hydrochloric acid against bromophenol blue.

Examles of polyisocyanates according to the invention are compounds that are known per se, preferably aliphatic polyisocyanates with particular mention of diisocyanates and their dimers and trimers such as uretdiones and isocyanurates. Examples include derivatives of hexamethylene-1, 6-diisocyanate (also denoted hexamethylene diisocyanate or HDI), octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanato-methyl)cyclohexane, 1,4- or 1,3- or 1,2-diisocyanato-cyclohexane, and 2,4- or 2,6-diisocyanato-1-methyl-cyclohexane, and mixtures of these. Most preferred is hexamethylene diisocyanate (HDI).

Also, reaction products or prepolymers of aliphatic polyisocyanates may be utilized. Particular mention is made of biurets, allophohanates, uretdiones and isocyanurates of the stated polyisocyanates. Preference here is given to using the dimers and/or trimers of the stated polyisocyanates, preferably of hexamethylene diisocyanate. In particular, the uretdiones and isocyanurates of the abovementioned polyisocyanates, that are known per se and also available commercially.

Isocyanurates can be prepared from any of a very wide variety of isocyanates, in the presence of particular catalysts, examples being sodium formate, potassium acetate, tertiary amines, or triphenyl-phosphines. The isocyanurate ring system constitutes a trimer consisting of three isocyanate groups in each case, are very stable, retaining their integrity even at high temperatures of more than 100° C., for example. Each of these three isocyanate groups originates from three different molecules of the respective isocyanate used; in other words trimeric structures are formed.

If polyisocyanates are used, examples being diisocyanates such as HDI, it is possible for an intermediate crosslinking to occur, and hence a plurality of isocyanurate rings may become linked to one another. It is known also to be possible for fractions of bridging diols, as for example hexanediol, to be added during the preparation of the isocyanurates, in order to modify their reactivity, for example, and in this way for a plurality of isocyanurate ring systems to become joined to one another. Likewise uretdiones, consisting of two isocyanate groups can be prepared by a similar catalytic reaction.

In one embodiment, said curing agent comprises a prepolymer based on an aliphatic polyisocyanate, preferably hexamethylene diisocyanate. "Prepolymers" in the context of the invention, are NCO-functional reaction products of isocyanates and polyols, such as polyethers or polyesters.

An exemplary prepolymer is a polyisocyanate containing aliphatic polyester groups which comprises repeating structural units —R—C(=O)—O—C—, where R is a divalent aliphatic radical. Preferred aliphatic polyester groups are polylactone groups, more particularly polycapro-lactone groups. Polycaprolactones and their preparation, by reaction of a monoalcohol with epsilon-caprolactone, for example, are known. They may be introduced, for example, by common methods, via reaction of an isocyanate group with at least one of the hydroxyl groups they contain. As a result of the polyester groups present and of the intermediate crosslinking, where it occurs, polyisocyanates such as for example hexamethylene diisocyanate (HDI) isocyanurates containing aliphatic polyester groups have a lower isocyanate content than, a pure HDI trimer. While the latter has an isocyanate content of about 25% (molecular weight 3×NCO=126 g/mol; molecular weight of the purely trimeric isocyanurate of HDI=504.6 g/mol), the polyisocyanate containing aliphatic ester groups typically possesses an isocyanate content of 5-20%, such as 5-15%, preferably 6-14%, such as 6-11% or 8-14% or 10-12%, such as about 11%. A commercially available polyisocyanate prepolymer containing aliphatic polyester groups is Desmodur E 2863. Another exemplary prepolymer based on HDI is Desmodur XP 2599 containing ether groups. Both prepolymers mentioned above are available from Covestro Deutschland AG, Leverkusen, Germany.

Preferred polyisocyanates are solvent-free and are substantially free of isocyanate monomer, i.e. contains less than 0.5% and more preferably less than 0.3% of isocyanate monomer as measured according to DIN EN ISO 10 283.

When polyisocyanates are used as curing agents, the functionality is defined as the number of isocyanate groups present per molecule. For practical purposes, the number of isocyanate groups is provided as an average due to the presence of various related types of polyisocyanate molecules within a commercial product. The expression "average functionality" refers to the functionality of a combination of two or more polyisocyanates. The "average functionality" is calculated as the total number of reactive (isocyanate groups) divided by the total number of polyisocyanate molecules. Typically, lower functionality yields less crosslinking, which results in more flexible, softer products, and higher functionality yields higher crosslinking and resulting stiffer, harder products. In a preferred embodiment, the average functionality of the polyisocyanates used in the composition of the present invention is in the range of 2-4, such as in the range of 3-4 or 2-3, such as in the range of 2-2.5.

Examples of commercially available polyisocyanates which are useful within the present invention include Desmodur N 3900, Desmodur E 2863 XP, Desmodur N 3800, Desmodur XP 2860 and Desmodur XP 2599; all available from Covestro Deutschland AG, Leverkusen, Germany. In one embodiment, the curing agent according to the present invention comprise one or more polyisocyanates selected from the group consisting of Desmodur N 3900, Desmodur E 2863 XP, Desmodur N 3800, Desmodur XP 2860 and Desmodur XP 2599.

The choice of the one or more polyisocyanates to be comprised in the curing agent may be based on the desired properties of the coating composition, such as the preferred degree of viscosity of the coating composition and flexibility of the coating layer. The term "one or more polyisocyanates" indicates that a blend of polyisocyanates can be used.

For both the topcoat and the LEP composition of the present invention, the total number of isocyanate groups in the curing agent component to the number of amine groups in the base component will typically be in the range of 80:100 to 160:100, such as 90:100 to 125:100, such as 95:100 to 120:100, preferably in the range of 100:100 to 120:100, such as 100:100 to 110:100 or 105:100 to 110:100. Preferably, the number of isocyanate groups is in excess of the number of amino groups, preferably just in minor excess in order to facilitate complete reaction of the amine groups.

Preparation of the Coating Compositions of the Invention

The coating compositions can be prepared from commercially available components. The base composition (including the one or more polyetheraspartic esters and potentially one or more aliphatic polyaspartic esters) and the curing agent (including the one or more polyisocyanates) may typically also comprise one or more other constituents, e.g. fillers and pigments, solvents and additives (e.g. thickening agents, wetting agents, dispersing agents, anti-sag agents, anti-settling agents, defoamers, and stabilizers).

Examples of fillers and pigments are calcium carbonate, dolomite, talc, mica, barium sulfate, kaolin, silica, titanium dioxide, red iron oxide, yellow iron oxide, black iron oxide, carbon black, phthalocyanine blue and phthalocyanine green. In the LEP coating composition the total amount of filler(s) and pigment(s) is preferably between 5-30%, such as between 10-25% by weight of the coating composition while the topcoat coating composition preferably contains about 20-40% such as about 25-30% of filler(s) and pigment(s) by weight of the coating composition.

Examples of additives are diluents, wetting agents, levelling agents and dispersants; defoaming agents such as silicone oils; stabilisers such as stabilisers against light and heat, e.g. hindered amine light stabilisers (HALS); stabilisers against moisture (water scavengers) such as substituted isocyanates, substituted silanes, ortho formic acid trialkyl esters and synthetic zeolites; stabilisers against oxidation such as butylated hydroxyanisole and butylated hydroxytoluene; thickeners and anti-settling agents such as organomodified clays (Bentone), polyamide waxes and polyethylene waxes.

Moreover, the base and/or the curing agent may be supplemented with one or more solvents. Preferable examples of suitable solvents are organic solvents such as toluene, xylene and naphtha solvent; ketones such as methyl ethyl ketone, methyl isobutyl ketone, diacetone alcohol and cyclohexanone; esters such as methoxypropyl acetate, n-butyl acetate and 2-ethoxyethyl acetate; and mixtures thereof. However as regards the claimed coating composition when for use in LEP, a solvent may not even be necessary due to the low viscosity of the remaining constituents of the coating composition because of the combined properties of the polyetheraspartic esters and polyisocyanate curing agent. E.g the LEP coating composition of the invention may be prepared in solvent-free form and thus, provide a good environmental profile. Hence, in the LEP coating composition preferably, the one or more solvents are included (or not included) in an amount of less than 25% by weight, such as less than 15% by weight, such as less than 10% by weight, preferably less than 5%, such as less than 2.5% by weight of the coating composition. Most preferably, when for use as an LEP coating composition, the composition is substantially free of any solvents meaning that one or more organic solvents has not been explicitly added in order, for example, to adapt the viscosity of the composition. "substantially free of any solvents" means that, if at all, only small amounts of one or more organic solvents are present in the coating composition as a result of the use of for example typical coatings additives, which may be optionally obtained commercially in solution in organic solvents.

When the claimed coating composition is for use as a topcoat, said composition preferably contains one or more added solvents in addition to the solvents that might be comprised in the coating composition as a result of the use of for example coating additives, which may be optionally obtained commercially in solution in organic solvents. Preferably an added solvent is present in an amount in the range of 10-30% by weight of the coating composition, such as in a range of 15-25% such as about 20% of said coating composition.

The coating composition may be prepared by suitable techniques that are commonly used within the field of coating production. The coating composition may be prepared by mixing two or more components e.g. two pre-mixtures whereof one pre-mixture comprises the base composition and one pre-mixture comprises the curing agent. Prior to mixing one or both of the pre-mixtures may be preconditioned to meet specific temperature requirements. It should be understood that when reference is made to the coating composition, it is the mixed coating composition.

Mixing of the base composition (comprising the one or more polyetheraspartic esters) and the curing agent (comprising the one or more polyisocyanates) allows a chemical reaction between the amino groups of the polyetheraspartic esters, and potential aliphatic polyaspartic esters when present, and the isocyanate groups of the polyisocyanates. The mixing ratio between the two components must therefore be carefully controlled in order to obtain a coating composition with the right physical properties. The mixing ratio is defined as the volumetric or weight ratio between the base composition and the curing agent. In the context of the present invention, the volumetric mixing ratio between the base composition and the curing agent is typically between 1:5 and 5:1, such as between 1:4 and 4:1, such as between 1:3 and 3:1, preferably between 1:2 and 2:1, such as between 1:1.5 and 1.5:1, such as about 1:1.

Application of the Coating Compositions of the Invention

Application of the coating compositions can be done by standard application methods such as by brush or roller. Furthermore, the claimed coating composition can be applied to the wind blade by spray application such as for example by conventional air-atomized spray application (topcoat) or by airless spray application (both topcoat and LEP). In practical embodiments, the base composition and the curing agent are mixed either in a single batch for normal spray application or as a continuous process when plural component spray equipment is used.

With the aim of facilitating easy application of the coating composition (e.g. by spray, brush or roller application techniques), the LEP composition typically has a viscosity in the range of 150-5000 mPa·s, such as 250 to 3000 mPa·s, preferably in the range of 500-2500 mPa·s, such as 500-2000 mPa·s; while the topcoat composition typically has a viscosity in the range of 50-500 mPa·s, such as about 50-300 mPa·s, such as about 50-200 mPa·s. Typically, the LEP composition has a higher viscosity than the topcoat composition.

Preferably, the coating composition is applied in one or more layers and the total dry film thickness of the coating composition is between 50 and 1000 μm.

Also preferably, the part of the outer surface of the wind turbine blade coated with the coating composition comprises at least a predominant portion of the leading edge of the blade, but the total surface of the wind turbine blade can be coated with the coating composition.

In the context of the invention, the wind blade to which the topcoat coating composition is applied is typically pre-coated with one or more coating layers comprising a primer to which the topcoat coating composition is applied. Preferably, the wind blade to which the topcoat coating composition is applied is pre-coated with at least one or more layers of a primer.

In the context of the invention, the wind blade to which the LEP coating composition is applied can be pre-coated with one or more coating layers comprising a primer and/or a topcoat to which the coating composition is applied. Preferably, the wind blade to which the LEP coating composition is applied is pre-coated with at least one or more layers of a primer and/or a topcoat.

In one embodiment, the invention relates to a wind blade having on at least a part of the outer surface thereof one or more coating layers prepared from a topcoat composition of the invention and thereon one or more layers of an LEP coating prepared from an LEP coating composition of the invention, wherein said LEP coating composition is applied to at least a part of the leading edge of the wind blade. Optionally, the wind blade has been be pre-coated with one or more coating layers comprising a primer.

Hence, the present invention also provides a method for coating a wind blade, said method comprising applying a coating composition as defined herein to at least a part of the surface of said wind blade; and allowing the coating composition to cure.

Since the use of the coating compositions of according to the invention includes both the use for topcoats and use in Leading Edge Protection, a further embodiment of the invention provides a method for coating a wind blade comprising the steps, i) applying a coating composition according to the invention for use as a topcoat to at least a portion of the wind blade and allowing the composition to cure; followed by ii) applying a coating composition according to the invention for use in Leading Edge Protection to at least the leading edge of a wind blade and allowing the composition to cure.

In another embodiment the invention provides a method for coating a wind blade comprising the steps, i) applying a coating composition according to the invention for use in Leading Edge Protection to least the leading edge of a wind blade and allowing the composition to cure, followed by ii) applying a coating composition according to the invention for use as a topcoat to at least a portion of the wind blade and allowing the composition to cure.

Said wind blade may be pre-coated with a primer before applying the topcoat and/or LEP coating composition.

After application of the coating composition to the wind blade, the coating composition is allowed to cure under controlled ambient temperature and humidity. The coating composition is preferably cured at a temperature not exceeding 70° C., in particular at a temperature in the range of 0-45° C., such as a temperature in the range of 15-35° C. The actual temperature at which the coating composition can be cured is normally set at the lower limit by the temperature at which the coating composition is practically curable and at the upper limit by the temperature at which the integrity of the wind blade and any underlying coats will be compromised.

The coating compositions of the present invention may also be used in a method for repairing a wind blade. The method for repairing a wind blade would comprise a step of applying the coating composition of the present application to at least a portion of the wind blade. The coating can be applied to substantially all of the wind blade, or just to a portion of the wind blade, such as the leading edge of the wind blade. In certain embodiments, one or more of the coating layers can be applied to at least a portion of the wind blade. The wind blade repaired in this manner can have a pre-existing coating or coating layers, some or all of which may be removed prior to application of the claimed coating composition. Alternatively, the claimed coating composition could be painted over the existing coating layer(s). Thus, the invention also relates to a method for repairing and/or replacing or partly replacing an existing coating layer on a wind blade. In one embodiment, if the coating composition is painted over an existing coating layer(s), an adhesion promoter may be applied on the existing coating layer before application of the coating composition of the invention, to improve the adherence of the coating composition. In another embodiment, no adhesion promoter is applied. Adhesion promoters and uses thereof are known in the art.

Preferred features of the claimed coating compositions (both topcoat and LEP compositions) are—in addition to a high degree of flexibility—cohesion of the film (as a result of the cross-linking density), UV-resistance, gloss retention and adhesion to underlying coatings. Furthermore, preferably the coating composition, in particular the LEP composition, provides a coating that provides good protection against erosion caused by harsh weather conditions.

EMBODIMENTS OF THE INVENTION

In the following, embodiments of the invention are disclosed. The first embodiment is denoted E1, the second embodiment is denoted E2 and so forth.

It should be understood that the various aspects, embodiments, implementations and features of the invention mentioned herein may be claimed separately, or in any combination.

E1. Use of a coating composition comprising:
  a) a base composition comprising a polyetheraspartic ester having the formula (I) below

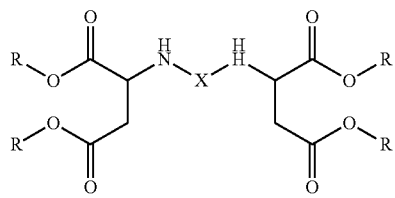

(I)

wherein each R represents a linear or branched $C_1$-$C_{10}$ alkyl residue, such as a linear or branched $C_1$-$C_6$ alkyl residue, preferably a methyl, ethyl, propyl or butyl residue; and wherein X is a polyether;
and
  b) a curing agent;
for coating of a wind turbine blade.

E2. The use according to embodiment 1, with the proviso that said coating composition is not:
A coating composition comprising:
  (a) an isocyanate-reactive component comprising:
    (a1) at least one polyaspartic ester, and
    (a2) optionally a polyetheraspartic ester;
  (b) an isocyanate component comprising:
    (b1) at least one isocyanate prepolymer, the isocyanate prepolymer being a reaction product of components comprising at least one aliphatic isocyanate and at least one polyether polyol, the poly ether polyol having a weight-average molecular weight of 400 to 6000 and the structure of formula I:

HO—$R^1{}_n$—$R^2$    I,

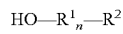

wherein $R^1$ has one or more of the following structures:

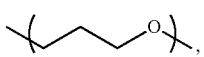

II

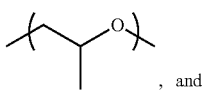

III

, and

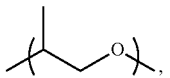

IV $R^2$ is one or more of the following: hydrogen and an organic group inert to an isocyanate group,
  n is an integer of 6 to 100,
  the amount of the —$R^1{}_n$— structure is at least 40 wt % based on the weight of the polyether polyol; and
    (b2) at least one isocyanate oligomer containing not less than two isocyanate groups,
    the weight ratio of the isocyanate prepolymer (b1) to the isocyanate oligomer (b2) being greater than 1:4 and less than 4:1;
  (c) a catalyst; and
  (d) optionally an additive;
wherein the molar ratio of the isocyanate groups to the isocyanate-reactive groups in the coating composition is from 1.5:1 to 4:1.

E3. The use according to any of embodiments 1-2, wherein X is a polyether wherein the repeating unit contains an alkyl residue of one or more carbon atoms linked by an oxygen atom, such as an alkyl residue of between two to six carbon atoms linked by an oxygen atom, such as an alkyl residue of two carbon atoms linked by an oxygen atom;
  wherein or more of said carbon atoms may be substituted with a small alkyl such as for example methyl, ethyl or propyl.

E4. The use according to any of embodiments 1-3, wherein X has a repeat unit of the structure below

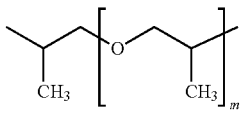

wherein m is in the range of 2 to 35, such as in the range of 2 to 10, such as in the range of 2 to 6, such as in the range of 2 to 4.

E5. The use according to any of embodiments 1-4, wherein said base composition comprises a blend of polyetheraspartic esters having formula (I) comprising at least two polyetheraspartic esters wherein X has a repeat unit of the structure below

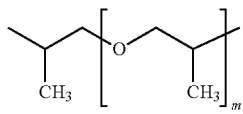

wherein the blend is such that the average value of m is in the range of 2 to 35, such as in the range of 2 to 10, such as in the range of 2 to 6, such as in the range of 2 to 4, such as in the range of 2.5 to 3.

E6. The use according to any of embodiments 1-5, wherein each R in formula (I) represents an ethyl residue.

E7. The use according to any of embodiments 1-4, wherein said polyetheraspartic ester is the reaction product of a dialkylmaleate, preferably a linear or branched $C_1$-$C_{10}$ dialkyl maleate, such as a linear or branched $C_1$-$C_6$ dialkyl maleate, such as diethyl maleate; and of a polyether polyamine according to the formula (II) below

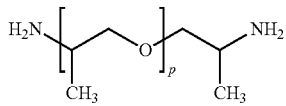
(II)

wherein p is in the range of 2 to 35, such as in the range of 2 to 10, such as in the range of 2 to 6, such as in the range of 2 to 4.

E8. The use according to any of embodiments 1-5, wherein said base composition comprises a blend of polyetheraspartic esters comprising at least two polyetheraspartic esters which are each the reaction product of a dialkyl maleate preferably a linear or branched $C_1$-$C_{10}$ dialkyl maleate, such as a linear or branched $C_1$-$C_6$ dialkyl maleate, such as diethyl maleate; and of at least two polyether polyamines according to the formula (II) below

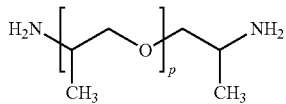
(II)

wherein the average value of p is in the range of 2 to 35, such as is in the range of 2 to 10, such as in the range of 2 to 6, such as in the range of 2 to 4, such as in the range of 2.5 to 3.

E9. The use according to any of embodiments 7-8, wherein said dialkylmaleate is diethylmaleate.

E10. The use according to any of embodiments 1-9, wherein said curing agent b) comprises one or more polyisocyanates.

E11. The use according to any of embodiments 1-2, wherein said coating composition comprises
 a) a base composition comprising a polyetheraspartic ester having the formula below

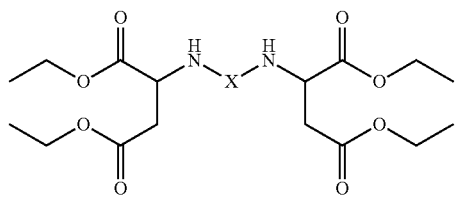

wherein X has a repeat unit of the structure below

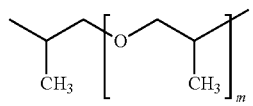

wherein m is in the range of 2 to 35, such as in the range of 2 to 10, such as in the range of 2 to 6, such as in the range of 2 to 4;
and
 b) a curing agent comprising one or more polyisocyanates.

E12. The use according to any of embodiments 1 or 11, wherein said coating composition comprises
 a) a base composition comprising a polyetheraspartic ester blend having the formula below

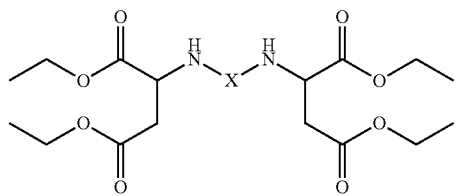

wherein X has a repeat unit of the structure below

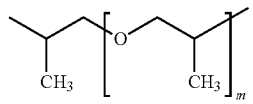

wherein the blend is such that the average value of m is in the range of 2 to 35, such as in the range of 2 to 10, such as in the range of 2 to 6, such as in the range of 2 to 4 such as in the range of 2.5 to 3; and
 b) a curing agent comprising one or more polyisocyanates.

E13. The use according to any of embodiments 10-12, wherein one or more of said one or more polyisocyanates is based on hexamethylenediisocyanate (HDI).

E14. The use according to any of embodiments 10-12, wherein one or more of said one or more polyisocyanates is based on a trimer of hexamethylenediisocyanate (HDI).

E15. The use according to any of embodiments 10-14, wherein said one or more polyisocyanates contains less than 0.5% isocyanate monomer, preferably less than 0.3% isocyanate monomer such as less than 0.1% isocyanate monomer; according to DIN EN ISO 10 283.

E16. The use according to any of embodiments 10-15, wherein the average functionality of said one or more polyisocyanates is in the range of 2-4, such as in the range of 3-4 or 2-3, such as in the range of 2-2.5.

E17. The use according to any of embodiments 10-16, wherein a) and b) are present in said coating composition in an amount so that the stoichiometric ratio of the number of isocyanate groups in the curing agent component to the number of amine groups in the base component is in the range of 80:100 to 160:100, such as 90:100 to 125:100, such as 95:100 to 120:100, preferably in the range of 100:100 to 120:100, such as 100:100 to 110:100 or 105:100 to 110:100; such as about 100:100.

E18. The use according to any of embodiments 1-17, wherein said coating composition further comprises
　　c) one or more further components selected from fillers, pigments, solvents and additives.

E19. The use according to embodiment 18, wherein said one or more further component comprises one or more components selected from the group consisting of calcium carbonate, dolomite, talc, mica, barium sulphate, kaolin, silica, titanium dioxide, red iron oxide, yellow iron oxide, black iron oxide, carbon black, phthalocyanine blue and phthalocyanine green.

E20. The use according to any of embodiments 18-19, wherein the total amount of filler(s) and pigment(s) is between 5-30%, such as between 10-25% by weight of the coating composition.

E21. The use according to any of embodiments 1-20, wherein said coating composition has a viscosity in the range of 150-5000 mPa·s, such as 250 to 3000 mPa·s, preferably in the range of 500-2500 mPa·s, such as 500-2000 mPa·s, such as about 1500 mPa·s.

E22. The use according to any of embodiments 1-21, wherein said coating composition is cured at a temperature below 90° C., such as below 70° C., such as a temperature in the range of 0-45° C., such as in the range of 15-35° C.

E23. The use according to any of embodiments 1-22, wherein said base composition a) comprises less than 20%, such as less than 15%, such as less than 10%, such as less than 5%, such as less than 1% of any aliphatic polyaspartic esters by weight of said base composition.

E24. The use according to any of embodiments 1-22, wherein said base composition a) optionally further comprises one or more aliphatic polyaspartic esters,
wherein the ratio of polyetheraspartic ester blend to aliphatic polyaspartic esters is in the range of 70:30 to 99:1, preferably in the range of 80:20 to 99:1, such as in the range of 85:15 to 99:1, most preferably in range of 90:10 to 99:1 such as 95:5 to 99:1.

E25. The use according to any of embodiments 1-22, wherein said coating composition is substantially free of any aliphatic polyaspartic esters.

E26. The use according to any of embodiments 1-22, wherein said base composition a) optionally further comprises one or more aliphatic polyaspartic esters,
wherein the ratio of polyetheraspartic ester blend to aliphatic polyaspartic esters is in the range of 70:30 to 99:1, preferably in the range of 80:20 to 99:1, such as in the range of 85:15 to 99:1, most preferably in range of 90:10 to 99:1 such as 95:5 to 99:1; or
wherein said coating composition is substantially free of any aliphatic polyaspartic esters.

E27. The use according to any of embodiments 1-26, wherein said coating composition comprises one or more solvents, wherein the total amount of solvent constitutes less than 25% by weight, such as less than 15% by weight, such as less than 10% by weight, such as less than 5% by weight, such as less than 2.5% by weight of the coating composition.

E28. The use according to any of embodiments 1-26, wherein said coating composition is substantially free of any solvents.

E29. The use according to any of embodiments 10-28, wherein said one or more polyisocyanates has an isocyanate content of 5-25%, such as 5-20%, such as 5-15%, preferably 6-14%, such as 6-11% or 8-14% or 10-12%; or such as about 6% or about 7% or about 8% or about 9% or about 10% or about 11%.

E30. The use according to any of embodiments 10-29, wherein said one or more polyisocyanates each contains aliphatic polyester groups.

E31. The use according to any of embodiments 1-19 and 29-30, wherein the total amount of filler(s) and pigment(s) is between 20-40%, such as between 25-30% by weight of the coating composition.

E32. The use according to any of embodiments 1-19 and 29-31 wherein said coating composition has a viscosity in the range of 50-1000 mPa·s, such as in the range of 50-500 mPa·s.

E33. The use according to any of embodiments 1-19 and 29-32, wherein said coating composition is cured at a temperature below 50° C., such as below 30° C., such as a temperature in the range of −10-30° C.

E34. The use according to any of embodiments 1-19 and 29-33, wherein said base composition a) further comprises one or more aliphatic polyaspartic esters,
wherein the ratio of polyetheraspartic ester blend to aliphatic polyaspartic esters is in the range of 40:60 to 60:40, such as in the range of 45:55 to 55:45, such as about 50:50.

E35. The use according to any of embodiments 1-19 and 29-34, wherein said coating composition comprises one or more solvents, wherein the total amount of solvent constitutes an amount in the range of 10-30% by weight of the coating composition, such as in a range of 15-25% such as about 20% by weight of said coating composition.

E36. The use according to any of embodiments 1-19 and 29-35 wherein said curing agent further comprises a polyisocyanate as defined in any of embodiments 13-16 and having an isocyanate content of between 20-26 w/w %, such as between 15-30 w/w %, such as between 22 to 24 w/w %, such as about 23 w/w %.

E37. The use according any of embodiments 1-30, wherein said composition is for use as a leading edge protective coating of said wind turbine blade.

E38. The use according to any of embodiments 1-30, wherein said coating composition is applied to at least the leading edge of said wind turbine blade.

E39. The use according to any of embodiments 1-30, wherein said coating composition is applied to the leading edge of said wind turbine blade.

E40. The use according any of embodiments 1-19 and 29-36; wherein said coating is for use as a topcoat for said wind turbine blade.

E41. A wind turbine blade having on at least a part of the outer surface thereof, a coating prepared from a coating composition as defined in any one of embodiments 1-36.

E42. The wind turbine blade according to embodiment 41 having on at least at the leading edge of said wind turbine blade, a coating prepared from a coating composition as defined in any one of embodiments 1-36.

E43. The wind turbine blade according to any of embodiments 41-42 having on the leading edge of said wind turbine blade, a coating prepared from a coating composition as defined in any one of embodiments 1-30.

E44. The wind turbine blade according to any of embodiments 41-43, wherein said coating constitutes the outermost coating layer.
E45. The wind turbine blade according to any of embodiments 43-44, wherein said coating is a leading edge protective coating.
E46. The wind turbine blade according to any of embodiments 43-45, wherein said coating is a leading edge protective coating, and
wherein said coating has been applied on top of a topcoat, or
wherein said coating has been applied underneath a topcoat preferably on top of a primer layer.
E47. The wind turbine blade according to embodiment 41 having a first coating layer which is a topcoat prepared from a coating composition as defined in any one of embodiments 1-19 and 29-36; and on top of said first coating layer having a second coating which is a LEP coat prepared from a coating composition as defined in any of embodiments 1-30 applied over the first coating layer on at least a part of the outer surface of said wind turbine blade such as on the Leading edge of said wind turbine blade.
E48. The wind turbine blade according to embodiment 41 having a first coating layer which is a LEP coating prepared from a coating composition as defined in any one of embodiments 1-30 applied on at least a part of the surface of said wind turbine blade such as on the Leading edge of said wind turbine blade; and on top of said first coating layer having a second coating which is a topcoat prepared from a coating composition as defined in any of embodiments 1-19 and 29-36 applied over the outer surface of said wind turbine blade and over the first coating layer of said wind turbine blade.
E49. The wind turbine blade according to any of embodiments 41-44 wherein said wind turbine blade has a primer layer applied underneath the topcoat and/or leading edge protective coating layer.
E50. A kit of parts comprising
  i) a container comprising a) a base composition comprising a polyetheraspartic ester having the formula (I) below

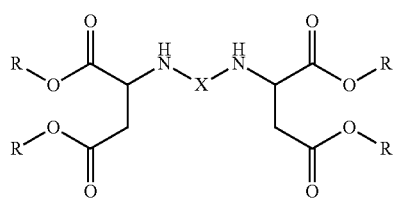

wherein each R represents a linear or branched $C_1$-$C_{10}$ alkyl residue, such as a linear or branched $C_1$-$C_6$ alkyl residue, preferably a methyl, ethyl, propyl or butyl residue; and wherein X is a polyether; and
  ii) a container comprising b) a curing agent.
E51. The kit according to embodiment 50, wherein X is a polyether wherein the repeating unit contains an alkyl residue of one or more carbon atoms linked by an oxygen atom, such as an alkyl residue of between two to six carbon atoms linked by an oxygen atom, such as an alkyl residue of two carbon atoms linked by an oxygen atom;
wherein or more of said carbon atoms may be substituted with a small alkyl such as for example methyl, ethyl or propyl.

E52. The kit according to any of embodiments 50-51, wherein X has a repeat unit of the structure below

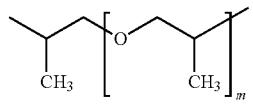

wherein m is in the range of 2 to 35, such as in the range of 2 to 10, such as in the range of 2 to 6, such as in the range of 2 to 4.
E53. The kit according to any of 50-52, wherein said base composition comprises a blend of polyetheraspartic esters having formula (I) comprising at least two polyetheraspartic esters
wherein X has a repeat unit of the structure below

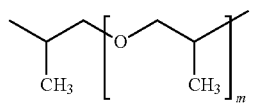

wherein the blend is such that the average value of m is in the range of 2 to 35, such as in the range of 2 to 10, such as in the range of 2 to 6, such as in the range of 2 to 4, such as in the range of 2.5 to 3.
E54. The kit according to any of embodiments 50-53, wherein each R in formula (I) represents an ethyl residue.
E55. The kit according to any of embodiments 50-54 wherein said polyetheraspartic ester is the reaction product of a dialkylmaleate, preferably a linear or branched $C_1$-$C_6$ dialkyl maleate, such as diethyl maleate; and of a polyether polyamine according to the formula (II) below

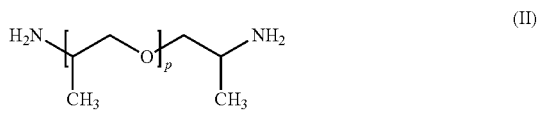

wherein p is in the range of 2 to 35, such as in the range of 2 to 10, such as in the range of 2 to 6, such as in the range of 2 to 4.
E56. The kit according to any of embodiments 50-54, wherein said base composition comprises a blend of polyetheraspartic esters comprising at least two polyetheraspartic esters which are each the reaction product of a dialkylmaleate, preferably a linear or branched $C_1$-$C_{10}$ dialkyl maleate, such as a linear or branched $C_1$-$C_6$ dialkyl maleate, such as diethyl maleate; and of at least two polyether polyamines according to the formula (II) below

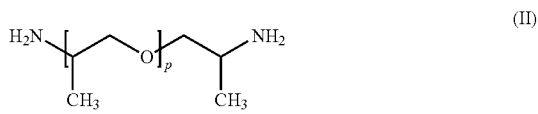

wherein the average value of p is in the range of 2 to 35, such as in the range of 2 to 10, such as in the range of 2 to 6, such as in the range of 2 to 4, such as in the range of 2.5 to 3.
E57. The kit or the coating composition according to any of embodiments 55-56, wherein said dialkylmaleate is diethylmaleate.

E58. The kit according to any of embodiments 50-57 wherein said curing agent comprises one or more polyisocyanates.

E59. The kit according to embodiment 50, wherein said kit comprises
i) a container comprising a) a base composition comprising a polyetheraspartic ester having the formula below

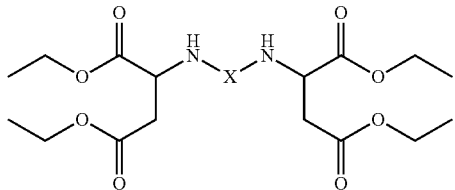

wherein X has a repeat unit of the structure below

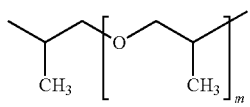

wherein, when m is in the range of 2 to 35, such as in the range of 2 to 10, such as in the range of 2 to 6, such as in the range of 2 to 4;
and
ii) a container comprising b) a curing agent comprising one or more polyisocyanates.

E60. The kit according to any of embodiments 50 or 59, wherein said kit comprises
i) a container comprising a) a base composition comprising a polyetheraspartic ester blend having the formula below

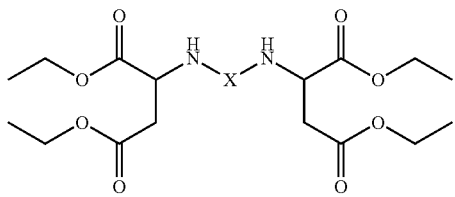

wherein X has a repeat unit of the structure below

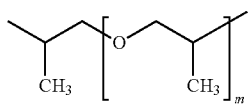

wherein the blend is such that the average value of m is in the range of 2 to 35, such as in the range of 2 to 10, such as in the range of 2 to 6, such as in the range of 2 to 4 such as in the range of 2.5 to 3; and
ii) a container comprising b) a curing agent comprising one or more polyisocyanates.

E61. The kit according to any of embodiments 58-60, wherein one or more of said one or more polyisocyanates is based on hexamethylenediisocyanate (HDI).

E62. The kit according to any of embodiments 58-61, wherein one or more of said one or more polyisocyanates is based on a trimer of hexamethylenediisocyanate (HDI).

E63. The kit according to any of embodiments 55-62, wherein said one or more polyisocyanates contains less than 0.5% isocyanate monomer, preferably less than 0.3% isocyanate monomer such as less than 0.1% isocyanate monomer; according to DIN EN ISO 10 283.

E64. The kit according to any of embodiments 58-63, wherein the average functionality of said one or more polyisocyanates is in the range of 2-4, such as in the range of 3-4 or 2-3, such as in the range of 2-2.5.

E65. The kit according to any of embodiments 58-64, wherein said one or more polyisocyanates has an isocyanate content of 5-20%, such as 5-15%, preferably 6-14%, such as 6-11% or 8-14% or 10-12%; or such as about 6% or about 7% or about 8% or about 9% or about 10% or about 11%.

E66. The kit according to any of embodiments 58-65, wherein said one or more polyisocyanates each contains aliphatic polyester groups.

E67. The kit according to any of embodiments 50-67, wherein said base composition a) in container i) optionally further comprises one or more aliphatic polyaspartic esters, wherein the ratio of polyetheraspartic ester blend to aliphatic polyaspartic esters is in the range of 70:30 to 99:1, such as in the range of 80:20 to 99:1, such as in the range of 85:15 to 99:1, most preferably in range of 90:10 to 99:1 such as 95:5 to 99:1, or
wherein said base composition a) in container i) is substantially free of any polyaspartic esters E68. The kit according to any of embodiments 50-66, wherein said base composition in container i) comprises less than 20%, such as less than 15%, such as less than 10%, such as less than 5%, such as less than 1% of any aliphatic polyaspartic esters by weight of said base composition.

E69. The kit according to any of embodiments 50-67, wherein said base composition in container i) comprises less than 20%, such as less than 15%, such as less than 10%, such as less than 5%, such as less than 1% of any acrylate-containing compounds by weight of said base composition.

E70. The kit according to any of embodiments 50-69, wherein said base composition in container i) comprises less than 20%, such as less than 15%, such as less than 10%, such as less than 5%, such as less than 1% of any silane-containing compounds by weight of the coating composition.

E71. The kit according to any of embodiments 50-70, wherein:
the total amount of solvent in said base composition in container i) constitutes less than 25% by weight, such as less than 15% by weight, such as less than 10% by weight, such as less than 5% by weight, such as less than 2.5% by weight of said base composition, or said base composition is substantially free of any solvents;
and/or
the total amount of solvent in said curing agent in container i) constitutes less than 25% by weight, such as less than 15% by weight, such as less than 10% by weight, such as less than 5% by weight, such as less than 2.5% by weight of said curing agent, or said curing agent is substantially free of any solvents.

E72. The kit according to any of embodiments 50-66, wherein said base composition in container i) further comprises one or more aliphatic polyaspartic esters,
wherein the ratio of polyetheraspartic ester blend to aliphatic polyaspartic esters is in the range of 40:60 to 60:40, such as in the range of 45:55 to 55:45, such as about 50:50.

E73. The kit according to any of embodiments 50-72, wherein said base composition a) in container i) and/or said curing agent b) in container ii) further comprises one or more further components selected from fillers, pigments, solvents and additives.

E74. The kit according to embodiment 73, wherein said one or more further component comprises one or more components selected from the group consisting of calcium carbonate, dolomite, talc, mica, barium sulphate, kaolin, silica, titanium dioxide, red iron oxide, yellow iron oxide, black iron oxide, carbon black, phthalocyanine blue and phthalocyanine green.

E75. The kit according to any of embodiments 50-74 further comprising instructions for use of said base composition and said curing agent.

E76. A method for coating a wind blade comprising a step of applying a coating composition as defined in any one of embodiments 1-36 to at least a portion of the wind blade, such as to the leading edge of the wind blade.

E77. The method according to embodiment 76 wherein said wind blade has been pre-coated with a primer layer before application of the coating composition as defined in any of embodiments 1-36.

E78. A method for coating a wind blade comprising the steps,
  i) applying a coating composition as defined in any one of embodiments 1-19 and 29-36 to at least a portion of the wind blade and allowing the composition to cure; followed by
  ii) applying a coating composition as defined in any of embodiments 1-30 to at least a portion of the wind blade such as at least the leading edge of a wind blade and allowing the composition to cure.

E79. A method for coating a wind blade comprising the steps,
  i) applying a coating composition as defined in any of embodiments 1-30 to at least a portion of the wind blade such as at least the leading edge of a wind blade and allowing the composition to cure.
  ii) applying a coating composition as defined in any one of embodiments 1-19 and 29-36 to at least a portion of the wind blade and allowing the composition to cure.

E80. The method according to any of embodiments 78-79, wherein said wind blade has been pre-coated with a primer layer before step i).

E81. A method for repairing a wind blade comprising a step of applying the coating composition as defined in any one of embodiments 1-36 to at least a portion of the wind blade such as to the leading edge of the wind blade.

E82. A method for repairing and/or replacing or partly replacing an existing coating layer on a wind blade comprising a step of applying the coating composition as defined in any one of embodiments 1-36 to at least a portion of the wind blade such as to the leading edge of the wind blade.

E83. The method according to any of embodiments 81-82, wherein said wind blade has one or more pre-existing coating layers;
wherein said one or more existing coating layers are painted over with said coating composition, or
wherein said one or more pre-existing coating layers, are at least partly removed prior to application of said coating composition, or
wherein said one or more pre-existing coating layers, are completely removed prior to application of said coating composition.

E84. The method according to any of embodiments 81-83, wherein said wind blade has a pre-existing coating layer which is a Leading Edge Protection coating layer;
wherein said leading edge protection coating layer is painted over by said coating composition, or wherein said leading edge protection coating layer is at least partly removed prior to application of said coating composition, or
wherein said leading edge protection coating layer is completely removed prior to application of said coating composition.

E85. The method according to any of embodiments 74-84, wherein said coating composition is applied by brush or roller, or by spray application, such as by airless spray application to said wind blade.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

The use of the terms "a" and "an" and "the" and similar referents in the context of describing the invention are to be construed to cover both the singular and the plural, unless otherwise indicated herein or clearly contradicted by context. For example, the phrase "the composition" is to be understood as referring to various "compositions" of the invention or particular described aspect, unless otherwise indicated.

The description herein of any aspect or aspect of the invention using terms such as "comprising", "having," "including" or "containing" with reference to an element or elements is intended to provide support for a similar aspect or aspect of the invention that "consists of", "consists essentially of" or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

The use of any and all examples, or exemplary language (including "for instance", "for example", "e.g.", and "such as") in the present specification is intended merely to better illuminate the invention, and does not pose a limitation on the scope of invention unless otherwise indicated.

Headings and sub-headings are used herein for convenience only, and should not be construed as limiting the invention in any way. The use of any and all examples, or exemplary language (including "for instance", "for example", "e.g.", and "such as") in the present specification is intended merely to better illuminate the invention, and does not pose a limitation on the scope of invention unless otherwise indicated. The citation and incorporation of patent documents herein is done for convenience only, and does not reflect any view of the validity, patentability and/or enforceability of such patent documents.

It should be understood that the various aspects, embodiments, implementations and features of the invention mentioned herein may be claimed separately, or in any combination.

EXPERIMENTAL

The invention will be illustrated by the following non-limiting examples.

Rain Erosion Test

The Rain Erosion Test (RET) is widely accepted as being the most suitable test for evaluating anti-erosive properties of coatings on the leading edge of wind turbine blades. The idea is to simulate the erosive effect from collision with raindrops, dust particles, hailstone and the like by creating a controlled rain field in which the coated surface moves at high speed.

Rain Erosion Test (RET) was carried out using a rotating arms test rig which was designed for the purpose by R&D A/S. The test was carried out according to the DNVGL-RP-0171 Recommended Practice, Testing of Rotor Blade Erosion Protection Systems.

The erosion damage was reproduced on specimens mounted on an arm which rotates horizontally, through an artificial rain field. The rain impacts the surface of the test specimen and erodes the surface, which is protected with the coating to be tested. The degree of erosion damage caused by the droplet impacts was inspected and documented. This was performed by visual inspection and picture documentation at defined intervals. Detailed picture documentation enables the investigation of the initial damage at the end of the incubation period, as well as the damage progress. The time needed to erode the surface to a specified limit, was the measure which is used to compare the performance of the protections systems with each other. There are two erosion stages which are commonly used to specify the survival time of the specimens:

1. End of incubation period: The incubation period is defined as the exposure time until the first damage is visually detectable on the outer surface of the test specimen. The incubation period depends on the impact speed and thus, for rotating arm test rigs, on the position on the specimen.
2. Breakthrough to the underlying substrate: Breakthrough is defined as the point in time when the erosion breaks through the protective layer to the underlying substrate. The time of breakthrough depends on the impact velocity and thus, for rotating arm test rigs it also depends on the location on the specimen.

45 cm long U-shaped test specimens based on NACA 634-021 aerofoil geometry simulating the leading edge of a wind turbine blade (as described in Appendix A.1, DNVGL-RP-0171), consisting of a composite substrate were coated with 200-600 μm (dry film thickness) of the coating compositions to be tested. The coating compositions were cured at controlled laboratory conditions, typically 25° C. and 50% RH, for at least 7 days to secure complete cure of the binder system.

Three test specimens were then mounted on the horizontal rotor arms, with a radial position of 1 m for the center of the specimen. The rotor was spun at a controlled radial velocity resulting in a range of test subject velocities.

Tables 1a and 1b below indicate the test condition parameters specified and/or monitored during each test.

TABLE 1a

Rain Erosion Test conditions for experiments in table 4a and table 5

| Test Parameter | Unit | Nominal condition |
|---|---|---|
| Speed (tip-centre-root) | m/s | 155-130-105 |
| Rain field | mm/h | 29-33 |
| Water temperature | ° C. | 8 |
| Water quality | μS | <5 |
| Test chamber temperature | ° C. | 8-10 |
| Mean droplet size, diameter, d | Mm | 2.2 |

TABLE 1b

Rain Erosion Test conditions for experiments in table 4b and table 6

| Test Parameter | Unit | Nominal condition |
|---|---|---|
| Speed (tip-centre-root) | m/s | 140-115-95 |
| Rain field | mm/h | 29-33 |
| Water temperature | ° C. | 8 |
| Water quality | μS | <5 |
| Test chamber temperature | ° C. | 8-10 |
| Mean droplet size, diameter, d | mm | 2.2 |

General Procedure for Preparation of Coating Compositions

The components of each of the base composition a) and the curing agent b) were produced by mixing the indicated ingredients for each of a) and b) in a conventional manner known to the person skilled in the art.

Component a) was then subsequently mixed with Component b) prior to application.

The mixed coating composition was applied to the composite test specimens, which were primed in advance, by brush application. The Examples below illustrates six coating compositions within the scope of the invention and one comparative coating composition wherein polyether aspartic ester has been substituted with an aliphatic aspartic ester.

The LEP coating compositions in table 4a and 5 were applied directly on the primed test specimens while the LEP coating compositions in table 4b were applied on primed test specimens coated with a topcoat.

Tables 2 and 3 below indicates the identity of aspartic ester and polyisocyanates applied in the examples.

TABLE 2

Aspartic esters applied in the examples (available from Covestro Deutschland AG, Leverkusen, Germany).

| Aspartic ester | Description | Amine value (mg KOH/g) |
|---|---|---|
| Aliphatic polyaspartic ester 1: Desmophen NH 1420 | Aminofunctional co-reactant for polyisocyanates. | 199-203 |
| Aliphatic polyaspartic ester 2: Desmophen NH 1423 | Aminofunctional co-reactant for polyisocyanates. | 202-208 |
| Polyetheraspartic ester: Desmophen NH 2850 XP | Aminofunctional co-reactant for polyisocyanates. | 170-210 |

TABLE 3

Polyisocyanates applied in the examples (available from Covestro Deutschland AG, Leverkusen, Germany).

| Composition | Polyisocyanate | Description | Isocyanate content (%) | Functionality (n) | Viscosity (mPa*s) |
|---|---|---|---|---|---|
| LEP | Polyisocyanate 1: Desmodur E 2863 XP | Polyester-modified polyisocyanate prepolymer based on hexamethylene-1,6-diisocyanate (HDI) | 11.0 | 2.2 | 1350 |
| LEP | Polyisocyanate 2: Desmodur N 3800 | Aliphatic polyisocyanate, flexibilizing HDI trimer. | 11.0 | 3.8 | 6000 |
| LEP | Polyisocyanate 3: Desmodur XP 2860 | Aliphatic polyisocyanate based on hexamethylene diisocyanate | 20.0 | 2.5 | 500 |
| LEP | Polyisocyanate 4: Desmodur XP 2599 | Aliphatic prepolymer containing ether groups and based on hexamethylene-1,6-diisocyanate (HDI) | 6.0 | 4.0 | 2500 |
| Topcoat | Polyisocyanate 5: Desmodur N 3900 | aliphatic polyisocyanate resin based on hexamethylene diisocyanate | 23.5 | 3.2 | 730 |

Tables 4 and 5 indicate compositions and RET results for coating compositions of the invention and for comparative coating compositions with an aliphatic polyaspartic ester fully or partly substituting the polyetheraspartic ester.
The amounts of each component indicated in the coating compositions in Tables 4 and 5 are given in percentages by weight of each total coating composition.
RET results are indicated in Table 4a as follows:
End of incubation period:
≥30 min: *
≥60 min: **
≥120 min: ***
Breakthrough to the underlying substrate:
≥30 min: +
≥60 min: ++
≥120 min: +++

TABLE 4a

LEP coating compositions and RET results, comparative example

| Component | | Model LEP Coating 1 | Comparative LEP Coating composition |
|---|---|---|---|
| | Aspartic ester: | | |
| a) | Aliphatic polyaspartic ester 1 | | 33.8 |
| | Polyether aspartic ester | 34.9 | |

TABLE 4a-continued

LEP coating compositions and RET results, comparative example

| | | Model LEP Coating 1 | Comparative LEP Coating composition |
|---|---|---|---|
| | Additives: | | |
| | Wetting and dispersing agent | 0.2 | 0.2 |
| | Thixotropic additive | 1.8 | 1.9 |
| | Defoamer | 0.3 | 0.3 |
| | Light stabilizer | 0.8 | 0.8 |
| | Pigments and fillers: | | |
| | Pigments | 5.1 | 5.3 |
| | Fillers | 8.7 | 8.1 |
| Component | Polyisocyanate: | | |
| b) | Polyisocyanate 1 | 48.2 | 49.7 |
| Stoichiometric ratio of isocyanate groups in b) to amine groups in a) | | 107:100 | 107:100 |
| Rain Erosion Test (RET) | End of incubation period | ** | * |
| | Breakthrough to the underlying substrate | +++ | ++ |

TABLE 4b

LEP coating compositions and RET results, examples with
increasing amounts of aliphatic polyaspartic ester.

| | Component | Coating A | Coating B | Coating C | Coating D | Coating E | Coating F |
|---|---|---|---|---|---|---|---|
| Component | Aspartic ester: | | | | | | |
| a) | Aliphatic polyaspartic ester 2 | 0.0 | 6.3 | 12.5 | 18.7 | 24.9 | 31.0 |
| | polyether aspartic ester | 31.7 | 24.4 | 18.2 | 12.1 | 6.0 | 0.0 |
| | Additives: | | | | | | |
| | Wetting and dispersing agent | 0.1 | 0.1 | 0.1 | 0.1 | 0.1 | 0.1 |
| | Thixotropic additive | 0.7 | 0.6 | 0.5 | 0.4 | 0.3 | 0.2 |
| | Defoamer | 0.3 | 0.3 | 0.3 | 0.3 | 0.3 | 0.3 |
| | Levelling agent | 1.0 | 1.0 | 1.0 | 1.0 | 1.0 | 1.0 |
| | Light stabiliser | 0.6 | 0.6 | 0.6 | 0.6 | 0.6 | 0.6 |
| | Pigments and fillers: | | | | | | |
| | Pigments | 9.1 | 9.0 | 9.0 | 9.0 | 9.0 | 8.9 |
| | Fillers | 11.9 | 13.6 | 13.8 | 14.0 | 14.1 | 14.3 |
| Component | Polyisocyanate: | | | | | | |
| b) | Polyisocyanate 1 | 44.6 | 44.1 | 44.0 | 43.8 | 43.7 | 43.6 |
| Stoichiometric ratio of isocyanate groups in b) to amine groups in a) | | 111:100 | 109:100 | 107:100 | 105:100 | 103:100 | 101:100 |
| Rain Erosion Test (RET) | End of incubation period | ≥9 h | ≥6 h | ≥4 h | ≥3 h | ≥2 h | ≥2 h |
| | Breakthrough to the underlying substrate | ≥12 h | ≥7 h | ≥6 h | ≥6 h | ≥6 h | ≥4 h |

TABLE 5

LEP coating compositions and RET results model coatings of the invention.

| | | Model Coating 2 | Model Coating 3 | Model Coating 4 | Model Coating 5 | Model Coating 6 |
|---|---|---|---|---|---|---|
| Component | Aspartic ester: | | | | | |
| a) | Polyetheraspartic ester | 32.4 | 30.5 | 32.8 | 41.4 | 23.8 |
| | Additives: | | | | | |
| | Wetting and dispersing agent | 0.6 | — | 0.6 | 0.8 | 0.5 |
| | Thixotropic additive | 2.2 | 2.2 | 2.2 | 2.8 | 1.6 |
| | Defoamer | 0.5 | 0.3 | 0.5 | 0.6 | 0.4 |
| | Light stabiliser | 0.6 | — | 0.6 | 0.8 | 0.5 |
| | Pigments and fillers: | | | | | |
| | Pigments | 5.1 | 10.6 | 5.1 | 6.5 | 3.7 |
| | Fillers | 12.9 | 12.3 | 11.3 | 14.3 | 8.2 |
| Component | Polyisocyanates | | | | | |
| b) | Polyisocyanate 1 | 45.7 | 44.1 | | | |
| | Polyisocyanate 2 | | | 46.7 | | |
| | Polyisocyanate 3 | | | | 32.8 | |
| | Polyisocyanate 4 | | | | | 61.4 |
| Stoichiometric ratio of isocyanate groups in b) to amine groups in a) | | 109:100 | 109:100 | 110:100 | 109:100 | 109:100 |
| Rain Erosion Test (RET) | End of incubation period | *** | *** | ** | * | ** |
| | Breakthrough to the underlying substrate | +++ | +++ | +++ | + | +++ |

The viscosities of the model LEP coating compositions lies in the range of 800-2500 mPa·s. while the comparative LEP coating has a viscosity of about 5500 mPa·s.

TABLE 6

Topcoat coating composition and RET results, model coatings of the invention.

| | Component | |
|---|---|---|
| Component a) | Aspartic ester: | |
| | Aliphatic polyaspartic ester 1 | 13.6 |
| | Polyetheraspartic ester | 13.3 |
| | Additives: | |
| | Levelling agent | 0.4 |
| | Light stabiliser | 0.5 |
| | Thixotropic agent | 2.5 |
| | Flatting agent | 2.6 |
| | Wetting and dispersing agent | 0.4 |
| | Solvents, pigments and fillers: | |
| | Filler | 16.5 |
| | Pigment | 8.9 |
| | Solvent | 23.0 |
| Component b) | Polyisocyanate | |
| | Polyisocianate 5 | 18.4 |
| Stoichiometric ratio of isocyanate groups in b) to amine groups in a) | | 107:100 |
| Rain Erosion Test (RET) | End of incubation period | ≥2 h |
| | Breakthrough to the underlying substrate | ≥3 h |

The formulation in Table 6 showed excellent properties for the use as topcoat in wind blades. The topcoat provide rain erosion protective effect on its own even without leading edge protection. Furthermore, the topcoat has very high abrasion resistance (60 mg, ASTM D4060, 23° C. and 50% RH CS10, 1000 g, 1000 rotations), flexibility (<8 mmØ cylindrical mandrel test at 23° C. and 50% RH, ISO 1519), tensile strength (18% strain at break) and resistance to accelerated weathering tests (ΔE<1 after 3000 hours, ISO 16474-3, type 1A (UVA-340), method 1).

The topcoat composition has a viscosity in the range of 80-150 mPa·s.

Characterization of various properties of the coating compositions can be done for example by the following methods:

Viscosity

The viscosity of the coating compositions was determined using Cone and Plate viscometer according to ISO 2884-1: 1999 using a Cone and Plate viscometer set at a temperature of 25° C. and providing viscosity measurement range of 0-5000 mPa·s.

Solids Content

The solids content in the coating compositions can be calculated in accordance with ASTM D5201, or de by determination of the percentage volume of non-volatile matter, dry film density and spreading rate of coating materials according to ISO 3233-1.

Calculation of the Volatile Organic Compound Content

The volatile organic compound (VOC) content of the coating compositions can be calculated in accordance with ASTM D5201.

Bend Test

A procedure in accordance with ISO 6860 or ISO 1519 can be followed. A 150-250 micron wet film is applied to a sanded and degreased steel panel of 0.8 mm thickness and, after curing, the coated metal panel is bent around a cylindrical mandrel and the flexibility is assessed by observation of cracking.

Impact

Impact can be tested according to ISO 6272-2, which specifies a method for evaluating the resistance of a dry film of paint, varnish or related product to cracking or peeling from a substrate when it is subjected to a deformation caused by a falling weight, dropped under standard conditions, acting on a small-area spherical indenter.

Taber Abrasion

Taber Abrasion is tested according to ASTM D 4060. A 1 kg weight is applied to the coated steel panel. A CS-10 abrasive wheel was used and 2×500 revolutions used. The results are presented in terms of the loss of film in mg.

Drying Time

Drying time can be evaluated using the Beck Koller method in accordance with ISO 9117-4 which specifies a test for determining the times taken to reach various stages of drying of organic coatings, using a mechanical straight-line or circular drying-time recorder.

Artificial Weathering

The resistance of the coatings to UV degradation can be tested by artificial weathering according to ISO 16474-3, following the Test Cycle 1. Test Cycle No 1: 4 hours UV-light at 60° C. with UVA-340 lamps (UVA-340, 0.83 W/m2 irradiation at 340 nm) followed by 4 hours condensation at 50° C. for a total of 1000 to 3000 hours.

Glass Transition Temperature

The glass transition temperature (Tg) of the binder and or the coating composition can be obtained by Differential Scanning calorimetry (DSC) measurements and/or by DMA Glass transition temperature (Tg) of the cured paint films determined by Dynamic Mechanical Analyser (DMA).

Tensile Strength

Tensile modulus and other aspects of the tensile stress/strain relationship can be measured according to ISO 527.

The invention claimed is:

1. A wind turbine blade comprising:
   an outer surface, and
   at least one coating applied to one part of the outer surface the at least one coating including a first coating prepared from a coating composition comprising:
   a) a base composition comprising a polyetheraspartic ester having formula (I) below

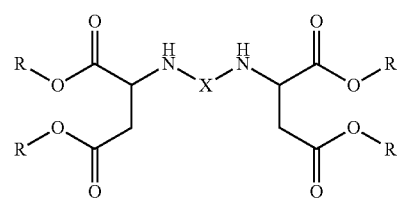

wherein each R represents a linear or branched $C_1$-$C_{10}$ alkyl residue; and
   wherein X is a polyether; and
   b) a curing agent.

2. The wind turbine blade according to claim 1, wherein said base composition a) further comprises at least one aliphatic polyaspartic ester, and wherein a ratio of the polyetheraspartic ester to the at least one aliphatic polyaspartic ester is in a range of 7:3 to 99:1.

3. The wind turbine blade according to claim 1, wherein said base composition comprises less than 20% of any aliphatic polyaspartic esters by weight.

4. The wind turbine blade according to claim 1, wherein X is a polyether including a repeating unit containing an alkyl residue of 1 to 6 carbon atoms linked by an oxygen atom.

5. The wind turbine blade according to claim 4, wherein the alkyl residue of the repeating unit is a methyl, ethyl or propyl residue.

6. The wind turbine blade according to claim 1, wherein X is a polyether including a repeating unit as shown below

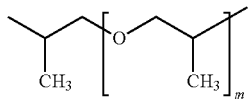

wherein m is in a range of 2 to 35.

7. The wind turbine blade according to claim 6, wherein m is in a range of 2 to 4.

8. The wind turbine blade according to claim 1, wherein each R in formula (I) represents an ethyl residue.

9. The wind turbine blade according to claim 1, wherein said curing agent comprises one or more polyisocyanates.

10. The wind turbine blade according to claim 9, wherein said one or more polyisocyanates includes an isocyanate content of 5-20% by weight, and/or wherein an average functionality of said one or more polyisocyanates is in a range of 2 to 4.

11. The wind turbine blade according to claim 9, wherein at least one of said one or more polyisocyanates contains aliphatic polyester groups.

12. The wind turbine blade according to claim 9, wherein said one or more polyisocyanates includes an isocyanate content of 10-12% by weight.

13. The wind turbine blade according to claim 1, wherein a stoichiometric ratio of a number of isocyanate groups in the curing agent to a number of amine groups in the base composition is in a range of 4:5 to 8:5.

14. The wind turbine blade according to claim 1, wherein said coating composition further comprises:
c) at least one of a filler, a pigment, a solvent, and an additive.

15. The wind turbine blade according to claim 1, wherein the at least one part includes at least a portion of a leading edge of the wind turbine blade, such that said first coating is a leading edge protective coating.

16. The wind turbine blade according to claim 15, wherein said leading edge protective coating is applied on top of a topcoat.

17. The wind turbine blade according to claim 15, wherein said leading edge protective coating is applied between a topcoat and a primer layer.

18. The wind turbine blade according to claim 1, wherein each linear or branched $C_1$-$C_{10}$ alkyl residue is a methyl, ethyl, propyl, or butyl residue.

19. The wind turbine blade according to claim 1, wherein said coating composition is free of any aliphatic polyaspartic esters.

20. The wind turbine blade according to claim 1, wherein said coating composition further comprises at least one of calcium carbonate, dolomite, talc, mica, barium sulphate, kaolin, silica, titanium dioxide, red iron oxide, yellow iron oxide, black iron oxide, carbon black, phthalocyanine blue and phthalocyanine green.

* * * * *